(12) United States Patent
Tucker

(10) Patent No.: US 7,018,579 B1
(45) Date of Patent: Mar. 28, 2006

(54) MANUFACTURING SYSTEM AND PROCESS

(76) Inventor: Richard R. Tucker, 2122 Wabash Ave., Terre Haute, IN (US) 47802

( * ) Notice: Subject to any disclaimer, the term of this patent is extended or adjusted under 35 U.S.C. 154(b) by 0 days.

(21) Appl. No.: 11/175,333

(22) Filed: Jul. 7, 2005

Related U.S. Application Data

(62) Division of application No. 11/059,727, filed on Feb. 17, 2005, now Pat. No. 6,976,835.

(51) Int. Cl.
*B29C 51/22* (2006.01)
(52) U.S. Cl. ............................. 264/172.19; 264/173.1; 264/210.5; 264/257; 264/258; 264/260; 264/266; 264/503; 264/510; 425/347; 425/388; 425/394; 425/402; 425/403; 425/403.1
(58) Field of Classification Search ........... 264/172.19, 264/257–258, 173.1, 210.5, 260, 266, 310, 264/503, 510, 511, 519; 425/346, 347, 348 R, 425/383, 394, 388, 403, 403.1, 402
See application file for complete search history.

(56) References Cited

U.S. PATENT DOCUMENTS

| | | | | |
|---|---|---|---|---|
| 6,042,765 | A * | 3/2000 | Sugahara et al. ........... | 264/46.1 |
| 6,242,074 | B1 * | 6/2001 | Thomas ....................... | 428/137 |
| 6,394,783 | B1 * | 5/2002 | Dalgewicz, III et al. .... | 425/388 |
| 6,814,905 | B1 * | 11/2004 | Dalgewicz et al. ....... | 264/37.32 |
| 2003/0082325 | A1 * | 5/2003 | Eftymiades et al. ...... | 428/36.91 |

* cited by examiner

*Primary Examiner*—Stefan Staicovici
(74) *Attorney, Agent, or Firm*—Daniel O'Connor

(57) ABSTRACT

A manufacturing system and method for use in the production of high strength plastic materials which can be used in the construction arts. The system and method includes a central rotary mold element which has vacuum means and cooling means placed inside thereof. Heating elements are positioned exteriorly of the rotary mold. Treated long fiber sheets are introduced to the rotary mold and combined with plastic sheets which are also fed to the mold.

1 Claim, 5 Drawing Sheets

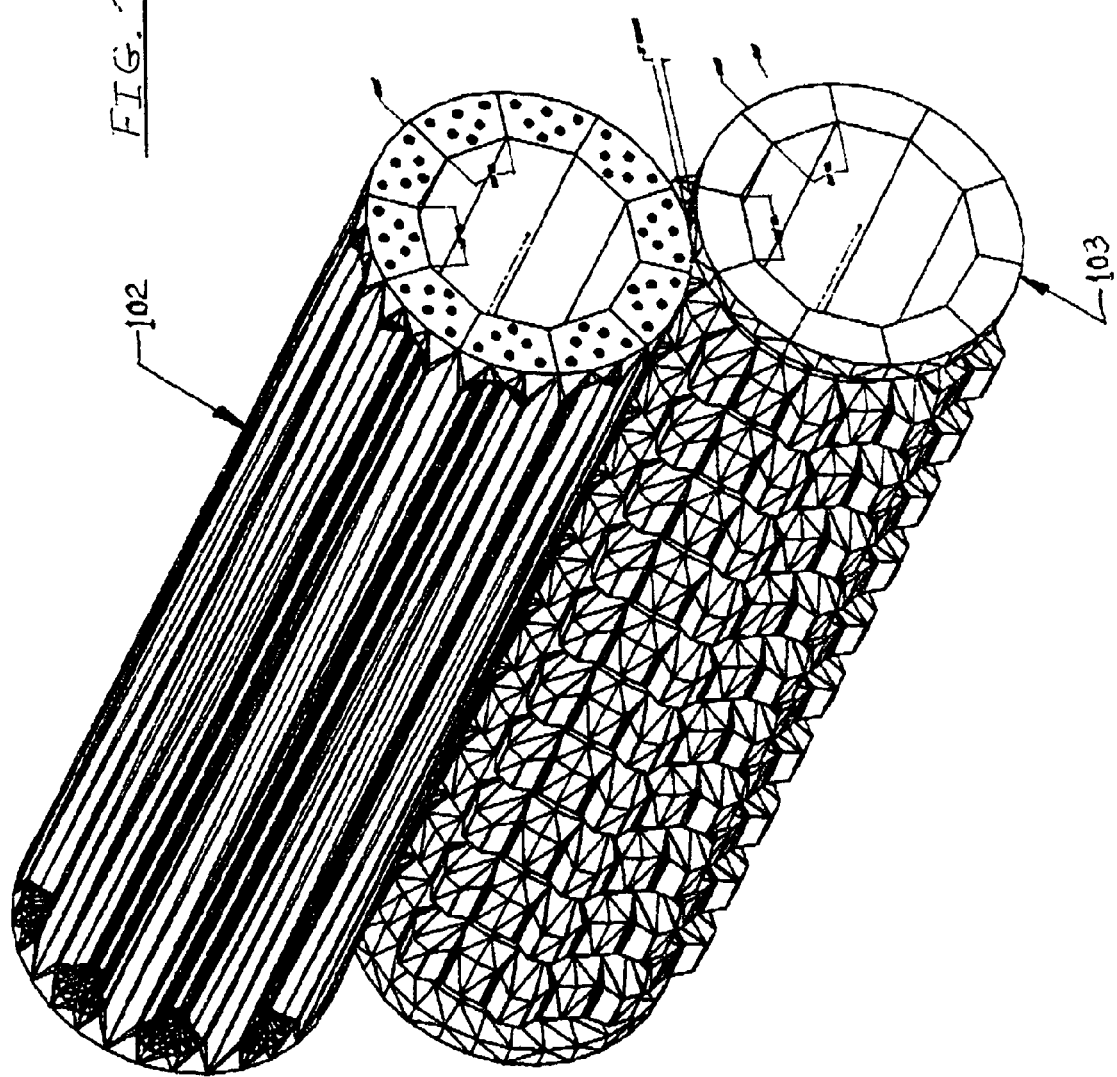

MANUFACTURING SYSTEM AND PROCESS

This is a Divisional of Ser. No. 11/059,727, filed Feb. 17, 2005, now U.S. Pat. No. 6,976,835.

BACKGROUND AND OBJECTS OF THE INVENTION

The present invention is generally related to the manufacturing arts and, in particular, to systems wherein multiple layers, including long fiber reinforcing layers, are joined together.

Prior art designs have included the following U.S. Patents:

U.S. Pat. No. 6,090,319 entitled "Coated, Long Fiber Reinforcing Composite Structure And Process Of Preparation Thereof, U.S. Pat. No. 6,676,864 entitled "Resin And Fiber Compounding Process For Molding Operations", U.S. Pat. No. 5,783,229 entitled "Thermoforming Process And Apparatus".

The above-listed prior art illustrates some of the very intensive efforts to arrive at an efficient means to conjoin multiple layers with reinforcing fibers. Such reinforced layers have broader uses in construction applications and are very valuable commercially.

Accordingly, it is an object of the present invention to demonstrate a novel and efficient method for joining multiple layers together. The system and method disclosed have utility with a very broad type of layers such as foam layers, rigid layers, printed layers, high temperature layers, barrier layers, ultraviolet layers and others which will be formulated in the future.

It is also an object of the invention to set forth a continuous forming machine which includes a central rotating mold element of a specialized design to allow a highly efficient manufacturing process.

It is a further object to disclose a novel invention which will be commercially successful on a worldwide basis to advance the commercial interests of the United States.

These and other objects and advantages of the invention will be apparent to those of skill in the art from the description which follows.

It is also an important object of the invention to demonstrate systems and methods of manufacture for products of a large end nature such as cars, trucks, houses, boats, flood barriers by the mile, acoustical units by the mile, farm equipment, storage units, shipping containers, billboards, roofing, paint booths, chemical equipment and many other large scale uses. The product can be produced in the shape of a pipe, for example only, and many other shapes. Where additional strength is needed, the system and method disclosed can accomodate many types of inserts and additional plastic sheets including long fiber type of compounds.

Throughout the specification and claims, reference is made to vacuum in the forming process. It is intended in such recitals to include pressure forming, i.e. air pressure is added to assist the vacuum to seal the materials together and to give more definition to the end product. Pressure forming is a further important aspect of the invention and is intended to to be broadly covered herein.

SUMMARY OF THE INVENTION

The manufacturing method and system of the invention includes a central rotary mold element.

Plastic layers and at least one long fiber layer are fed to the rotary mold and combined into a single reinforced layer which may be combined with a lower support layer to form a high-strength product which may be used, for example, in the construction arts.

The rotary mold includes cooling means and vacuum means which are positioned internally of the rotary mold. Plural heating elements are positioned in locations exterior of the rotary mold.

Catalytic bath means are provided for the treatment of the long fiber layers as they are fed into the manufacturing system.

An upper mold element having protrusions formed thereon may be included for the purpose of shaping particular components.

BRIEF DESCRIPTION OF THE DRAWING FIGURES

FIG. 7 is an isometric view of a rotary mold as combined with a compression mold having protrusions formed thereon.

FULL DESCRIPTION OF THE PREFERRED EMBODIMENTS

Figure 1:
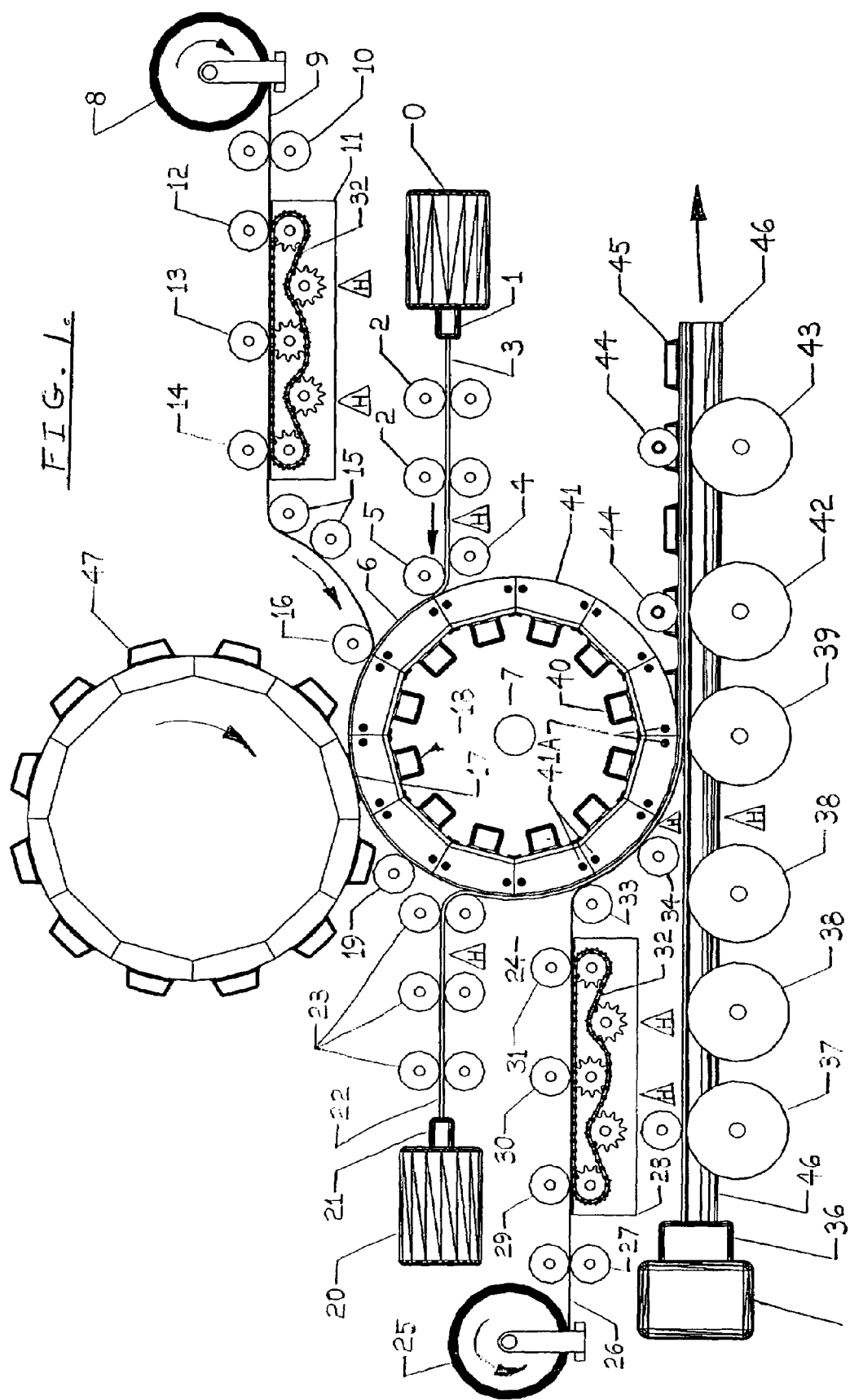
FIG. 1 is a side schematic view which shows the principal components of the manufacturing system and illustrates the method of operation.

Referring to the drawing figures, the process begins with an extruder, labeled as numeral "0" in the drawing, wherein the choice of plastic or other material is melted and forced through a die indicated at numeral "1". The flat sheet thus formed is then sized through sizer rolls indicated at numeral "2". The rollers 2 are powered so there is no unwanted slack from the extruder die 1.

The plastic sheet, indicated by numeral "3", being sized by rolls 2 and properly kept hot as indicated by the heater "H", is fed to at least one guide roll 4 and into roll 5 which is a compression roll acting against element 41.

Element 41 is the rotating main mold of the over-all system and will be further described.

The main rotating mold 41 includes features such as vacuum and cooling which may be applied or not depending upon the particular materials being treated.

The vacuum is turned on at the port indicated at numeral 7 which forms the sheet 3 into a beginning mold segment at numeral 6. The vacuum is turned on by a large sequential rotary valve enabling section 6 to keep the layer 3 in place as rotation proceeds to a compression roller shown at 16. The compression roll 16 presses fibers 9 onto the surface of the plastic layer 3.

Before the fibers 9 are pressed onto the surface at 6 by compression roll 16, they originate from a supply roll shown at numeral 8. The fiber sheet 9 proceeds through drive rolls 10 and then through the bath rolls 12 and thence down into a catalyzing bath 11 which is heated at several positions as indicated by letters H. A chain drive 32 runs the rollers 12, 13 and 14, thereby taking the fiber sheet in and out of the bath several times before being fed out to guide rolls 15.

The fiber sheet is pulled under roller 16 and compressed into the soft plastic molded at area 6.

After the fibers 9 are compressed by roller 16 into the plastic sheet 3, they continue rotating slowly at the same peripheral speed as rotary mold 47, the male components of which mate with the cavities in mold 41. As indicated at numeral 17, each female mold cavity has the fibers forced into it by mating male projections shown at 47.

Vacuum is maintained by the port shown at numeral 18 from numeral 7 and around to the position shown at numeral 40, where valves shut off the vacuum for the purpose of ejecting moldings. As the molded plastic fibers come around from position 17, they are further held against the unit 41 by compression roller means 19.

Meanwhile, in an extruder 20, another layer of plastic is being forced out of die 21. The plastic sheet, shown at numeral 22, is pulled and sized by rollers 23 and heated at H before it is compressed into the molded fibers from area 17.

Such compression is effected by the compression roller indicated at numeral 24.

The lamination from roller 24 continues rotating counterclockwise to the next compression roller for pressing another fibersheet into the previous plastic layer 22.

While plastic layer 22 is rotating from roller 24, a second fiber sheet is unrolling from supply roll 25 and runs through feeder rolls 27. This second fiber sheet 26 goes through feeder rolls 29 into the heated catalyst tank 28. Rollers 30 and 31 are also shown.

The second fiber sheet 26 is thus bathed in tank 28 in the manner described with regard to tank 11. The chain drive means is indicated at numeral 32*a*.

As the fiber sheet 26 exits via a stripper or cleaner roll 31, it is drawn to a compression roll 33 and mashed into plastic layer 22. It then rotates to a compression roller 34.

The lamination can be heated after compression roller 34 if needed so as to more easily join to the final extrusion 46 coming from extruder 35.

As the lamination molds of plastic sheets 3 and 22 along with molded reinforcing fiber sheets 9 and 26 rotate from compression roller 34, a final extrusion 46 is pushed out through the extruder die 36 by extruder 35. The extrusion 46 may comprise, for example only, a plurality of tubes to which the laminated sheets are to be attached.

As extrusion 46 moves from the extruder die 36, it is pushed along and kept to size by rolls 37 which direct it into guide rolls 38.

As extrusion 46 meets the lamination layers coming down to a compression roll 39, they have been heated and get compressed together at 39.

Immediately, cooling indicated at 41*a* takes place and vacuum at port 40 is cut off to release the molded cavity into a straight line of moldings and laminations.

The cooling and vacuum operations are as described herein.

Figure 2:
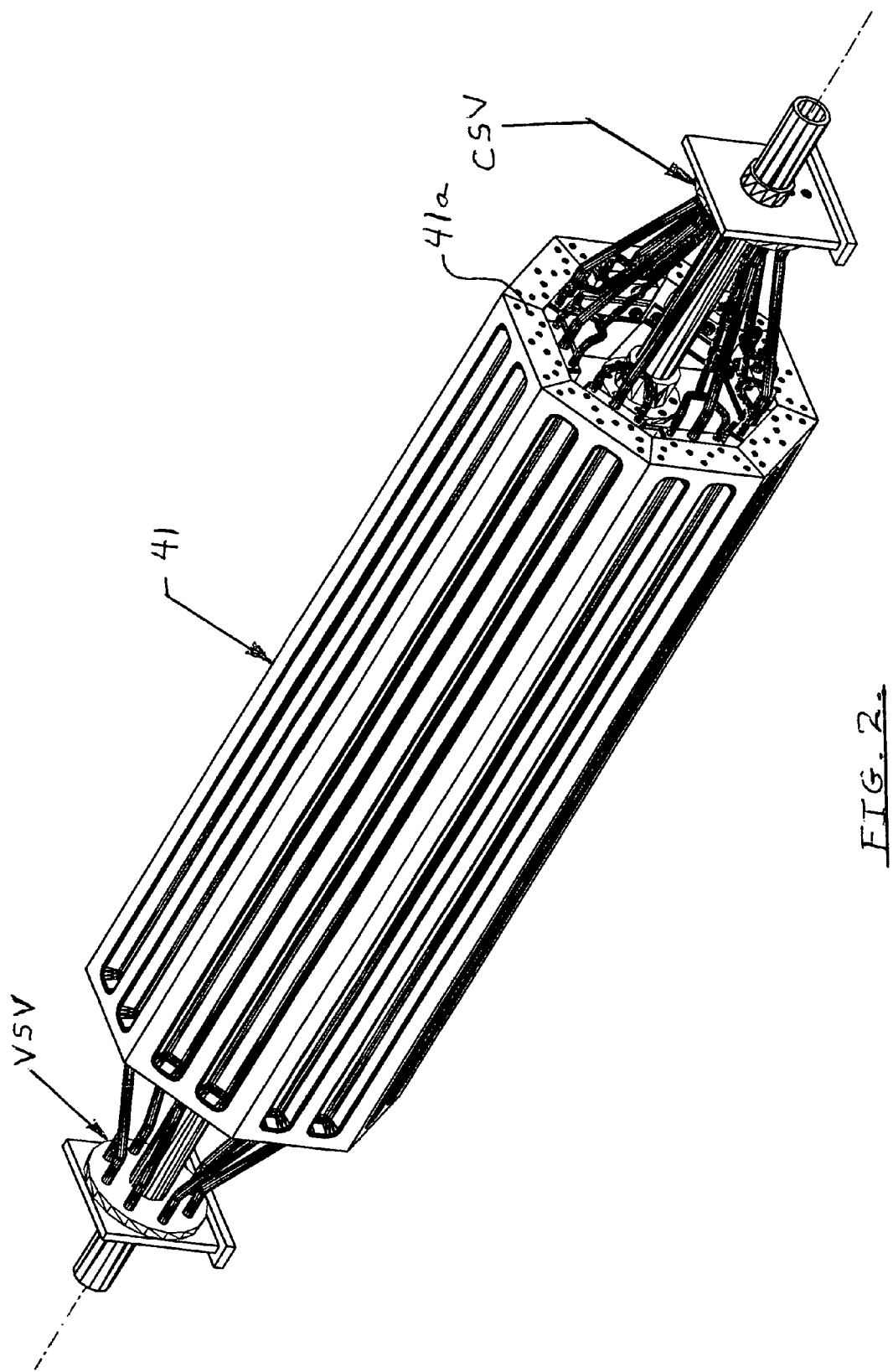
FIG. 2 is a view of a rotary mold and shows the supply of cooling and vacuum means to an internal location of the rotary mold.

As indicated schematically in the drawing FIG. 2, cooling at positions 41*a* is controlled anywhere needed around the outer portions of mold 41 by a coolant sequential valve, labeled "CSV" in FIG. 2.

The vacuum needed is turned on via sequential valves located on an opposite end from the coolant sequential valving. The vacuum sequential valving is indicated at "VSV" in FIG. 2.

Referring back to FIG. 1 and the end of the process shown, the completed product passes through sizing rollers 42 and 43. The upper rolls 44 shown are small floating rolls which serve to hold and size the upper molded features.

The final product is pushed out straight as a unitary combination of a top fiber-reinforced multi-layer element 45 and a lower supporting base 46.

Figure 3:
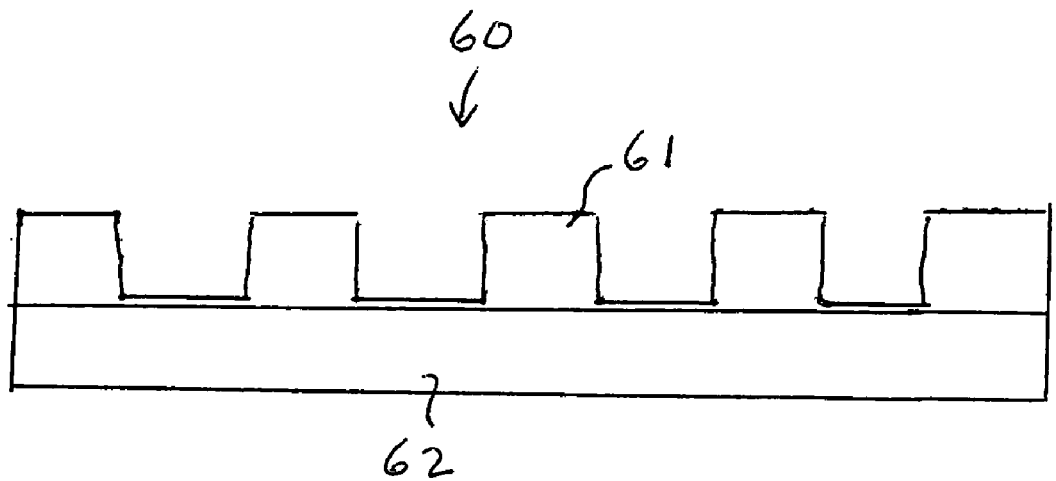
FIGS. 3–5 are schematic views of a product produced by the system described.
Figure 4:
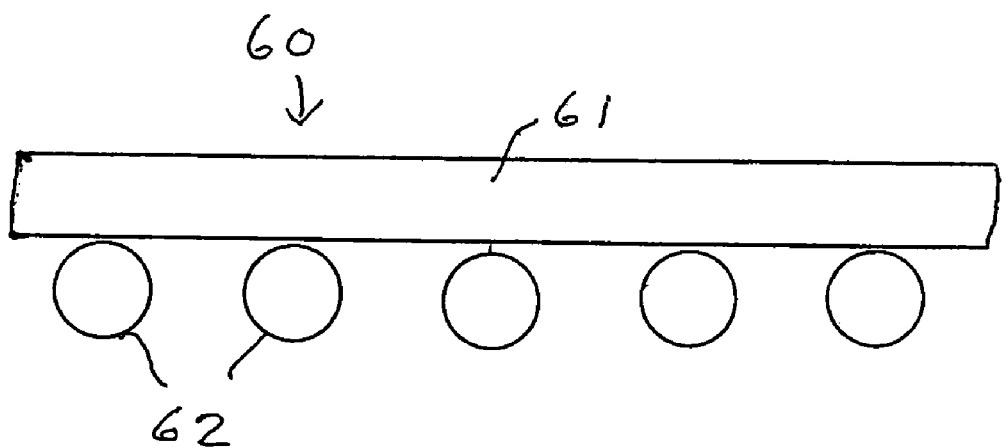
Figure 5:
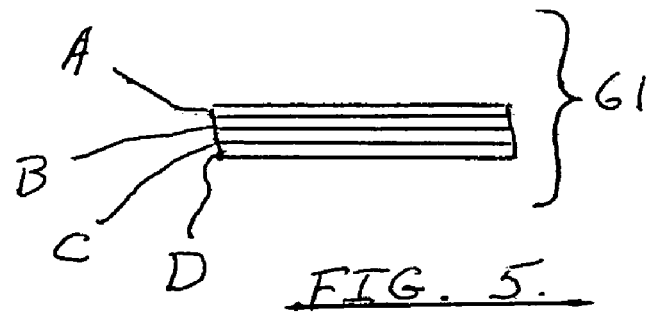

FIGS. 3, 4 and 5 indicate schematically an example of the type of high quality product which can be produced by the described process.

Referring to FIGS. 3, 4 and 5, a sample finished product is indicated at numeral 60.

The upper portion of the product, indicated at numeral 61, comprises four layers A, B, C and D. As previously described with respect to the manufacturing method, layer A could comprise a layer of plastic or other equivalent material. Layer B would typically comprise a long fiber type reinforcing agent. Layer C would comprise another plastic or equivalent layer. Layer D would comprise another long fiber reinforcing layer.

The lower portion of the product, indicated at numeral 62, would comprise plural tubes which have been supplied to the assembly process as previously described.

As will be appreciated, many more layers can be easily added to the manufacturing process by utilizing a central rotary mold as described herein. For example, several long fiber layers could be used for a special project where higher strength is required.

Figure 6:
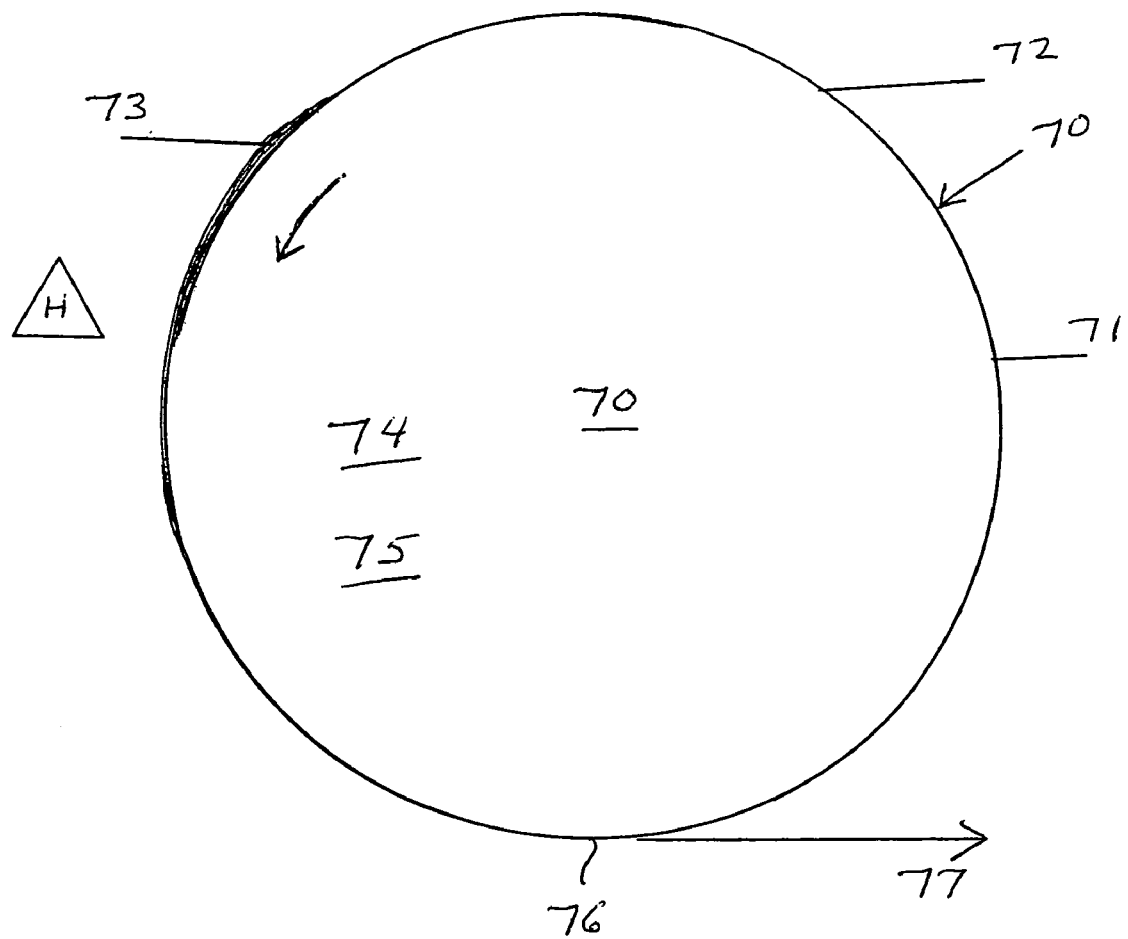
FIG. 6 is a schematic view which illustrates the position of heating, cooling and vacuum means relative to the overall system.

As indicated schematically in FIG. 6, the broader method aspects of the include the following method steps:

a) providing a central rotary mold element 70, b) providing a vacuum supply means 74 to an interior of said central rotary mold, c) providing a cooling supply means 75 to an interior of said rotary mold, d) providing-heating means H at positions exterior of said rotary mold, e) supplying a first sheet of plastic 71 or equivalent material to said rotary mold, f) supplying a sheet of long fiber material 72 to said rotary mold, g) supplying a second sheet of plastic 73 or equivalent material to said rotary mold, h) conjoining said three layers 71, 72 and 73 and passing said layers to a lower portion 76 of the rotary mold, i) pushing said joined layers away from the rotary mold at 77.

Referring to FIG. 7, an isometric view of two components of a typical system is shown.

The rotating mold 102 has plural elongated cavities formed therein to receive the protrusions formed on roller 103. FIG. 7 illustrates the relative sizing between roller components.

While particular systems and methods have been described herein, it is intended to cover all equivalent systems and methods which would reasonably occur to those of skill in the art. The invention is further defined by the claims appended hereto.

I claim:

1. A method of manufacturing a plastic product having plural layers mounted to a lower extruded layer, said method utilizing the following steps, providing a rotary mold element, said rotary mold element having plural elongated cavities formed therein and including internal cooling means for application to the product being manufactured, said rotary element including internal vacuum means for application to the product being manufactured, said manufacturing method including providing heating means for application to the product being manufactured, said heating means being located externally of said rotary mold, providing extrusion means for supplying a first layer of plastic material, providing roll means for supplying a layer of long fiber strengthening material, providing second extrusion means for supplying a second layer of plastic material, said manufacturing method including providing a second rotary element having plural male protrusions formed thereon, said male protrusions mating with said elongated female cavities of said rotary mold element, and further including a catalytic bath means for treating said layer of long fiber strengthening material, said catalytic bath means being heated by heating elements, wherein said rotary mold element is provided with internal cooling means and internal vacuum means and whereby said cooling means is supplied at a first end of said rotary mold element by means of a coolant sequential valve and whereby said vacuum means is supplied at a second end of said rotary mold element by means of a vacuum sequential valve, wherein said rotary mold element includes plural cooling channels around the entire outer parts thereof and plural vacuum passages around the entire outer parts thereof and wherein said plural channels and passages are activated by means of the respective sequential valves.

* * * * *